US005590374A

United States Patent [19]

Shariff et al.

[11] Patent Number: 5,590,374
[45] Date of Patent: Dec. 31, 1996

[54] METHOD AND APPARATUS FOR EMPLOYING A DUMMY READ COMMAND TO AUTOMATICALLY ASSIGN A UNIQUE MEMORY ADDRESS TO AN INTERFACE CARD

[75] Inventors: Ryan E. Shariff; Gerald Moseley; Jack J. Chen, all of San Jose; Wen-Feng Chang, Saratoga; Fazal Abbas, San Jose, all of Calif.

[73] Assignee: Fujitsu Limited, Kawasaki, Japan

[21] Appl. No.: 594,374

[22] Filed: Jan. 30, 1996

Related U.S. Application Data

[63] Continuation of Ser. No. 119,511, Sep. 10, 1993, abandoned.
[51] Int. Cl.⁶ .................................. G06F 15/177
[52] U.S. Cl. .................. 395/829; 395/830; 395/284
[58] Field of Search .................. 340/825.07, 825.52; 395/200.1, 828, 829, 830, 284, 800

[56] References Cited

U.S. PATENT DOCUMENTS

| | | | |
|---|---|---|---|
| 4,430,699 | 2/1984 | Segarra et al. | 395/200.03 |
| 4,660,141 | 4/1987 | Ceccon et al. | 395/829 |
| 4,675,813 | 6/1987 | Locke | 395/829 |
| 4,755,934 | 7/1988 | Inoue | 395/823 |
| 4,773,005 | 9/1988 | Sullivan | 395/829 |
| 4,899,274 | 2/1990 | Hansen et al. | 395/200.1 |
| 4,953,180 | 8/1990 | Fieschi et al. | 375/7 |
| 5,274,771 | 12/1993 | Hamilton et al. | 395/829 |
| 5,428,748 | 6/1995 | Davidson et al. | 395/829 |
| 5,434,982 | 7/1995 | Calzi | 395/284 |

FOREIGN PATENT DOCUMENTS 10536269  6/1993  Japan.

*Primary Examiner*—Lance Leonard Barry, Esq.
*Attorney, Agent, or Firm*—Christie, Parker & Hale, LLP

[57] ABSTRACT

An interface controller for an addressable interface module. The interface module is for coupling along with other addressable interface modules over a communication bus to a central processor. Each interface module responds to a unique base address, unique to such interface module provided by the central processor on the communication bus, responsive either to a read command for reading data from such interface module to the communication bus or to a write command for writing data from the communication bus to such interface module. A stored configuration base address is provided in the interface controller for use in determining the unique address for which the corresponding interface module is to respond. A decoder in the interface controller decodes the base address including a modified configuration address for use by the corresponding interface module in determining the unique address for response by the corresponding interface module. The stored configuration base address is automatically modified in the event the base address is the same as the unique base address for one of the other interface modules. In this regard, the means is responsive to a predetermined address on the communication bus and a read command for modifying the stored configuration base address to such modified configuration address.

21 Claims, 10 Drawing Sheets

Fig. 11

| | | HEX |
|---|---|---|
| 64K | GENERAL SLOT I/O | FFFF |
| | | FD00 |
| | PLATFORM I/O RESERVED | FCFF |
| 63K | | FC00 |
| ~ | ~ | ~ 0C00 |
| 3K | | 0BFF |
| | GENERAL SLOT I/O | |
| | | 0900 |
| | PLATFORM I/O RESERVED | 08FF |
| 2K | | 0800 |
| | | 07FF |
| | GENERAL SLOT I/O | |
| | | 0500 |
| | PLATFORM I/O RESERVED | 04FF |
| 1K | | 0400 |
| | | 03FF |
| | GENERAL SLOT I/O | |
| | | 0100 |
| 256 | PLATFORM I/O RESERVED | 00FF |
| 0 | | 0000 |

METHOD AND APPARATUS FOR EMPLOYING A DUMMY READ COMMAND TO AUTOMATICALLY ASSIGN A UNIQUE MEMORY ADDRESS TO AN INTERFACE CARD

CROSS-REFERENCE TO RELATED APPLICATION

This is a continuation of application Ser. No. 08/119,511, filed Sep. 10, 1993, now abandoned.

FIELD OF THE INVENTION

This invention relates to an add-on card for personal computers, and more particularly, to an add-on interface card for an International Business Machines (IBM) AT compatible personal computer for connecting an AT bus to an external Ethernet network.

BACKGROUND OF THE INVENTION

IBM AT and AT compatible personal computers use an AT standardized bus system for internal communication. The AT bus is generally called Industry Standard Architecture (ISA) bus for 8 and 16 bit systems and Extended Industry Standard Architecture (EISA) for 32 bit systems. The requirements of the AT bus are described in detail in *AT Bus Design*, Edward Solari (Annabooks, 1990), the subject matter of which is incorporated herein by reference. The AT bus is an interface between various functional units of the computer, e.g., the central processing unit (CPU) memory and various interfaces for input/output (I/O) devices. The AT bus provides the logic necessary to control the system clock, memory devices, read and write access, I/O read and write cycles, data bus direction, data and interrupt requests, and speaker driver. The memory devices include hard disks, floppy disks, electrically erasable programmable read-only memory (EEPROM), and random access memory (RAM). The I/O devices include a printer, a modem, and an ethernet communication network.

The personal computer comprises a housing containing a module card rack for holding and interconnecting electronic modules. When the housing is opened, electronic modules are inserted into the rack and connected to a mother board which is located at an end of the computer housing opposite the opening of the housing. The mother board provides the electrical interconnections between modules in the computer including the AT bus, power, and grounds. A user can alter the capability of the personal computer by adding or removing computer modules from the computer housing. For example, memory capacity may be increased by inserting a RAM (Random Access Memory) module into the housing.

Each device connected to the AT bus and having memory must also have a memory base address that defines the memory space that the device uses so that the CPU may command reads from or writes into that memory. It is necessary that each memory have a unique memory base address so that only one device responds to these read and write commands. The AT bus specification allocates certain memory addresses to particular devices. More specifically, the hard disk, the floppy disk drives, and RAM memory are each assigned a unique memory base address ranges. Accordingly, every personal computer uses these addresses for communication with the hard disk, the floppy disk drives, and the RAM. In contrast, when a new device is connected to the personal computer, its memory base address must not be one of the previously allocated addresses but can be any address within an unreserved address range. However, when multiple devices are added, each with its own memory and corresponding memory base address, it is possible that two or more devices may have identical memory base addresses. If this should happen, during the initialization routine at system power up, the CPU sends an address that corresponds to the two or more different devices. Each of the two or more different devices respond to the address command and all try to either read from or write into memory. This multiple response creates a conflict on the data portion of the bus. The CPU in some cases, may be able to detect this conflict on the bus because, for example, during system boot-up and during a read, the data that will be read may differ from system expected values.

In existing systems, one type of add-on card is an Ethernet interface module for interfacing between the AT bus and an Ethernet network system. The requirements of the Ethernet are described in detail in Information Processing Systems—Local Area Networks—Part 3: Carrier sense multiple access with collision detection (CSMA/DC) access method and physical layer specifications, International Standard ISO, 8902-3: 1989, ANSI/IEEE Std 802.3—1988, published by Institute of Electrical and Electronics Engineers, Inc., 1989, the subject matter of which is incorporated herein by reference. Also, in existing systems, when a memory address conflict is detected, it is necessary to power-down the system and remove from the system the add-on card that is suspected of having a conflict, alter its configuration by whatever means that are provided on the module, and then replace it in the system and power up and retest the modules's operation. (The means used in existing systems for altering base addresses are moveable jumpers or switches.) The CPU again executes its initialization routine, and, if another memory base address conflict is detected, the process of removing the module and physically changing its memory base address is repeated, until the memory conflict is eliminated. If no memory conflict is detected, the CPU continues executing its initialization routine.

Several I/O interface devices, connected to the AT bus each have an I/O base address. When the device detects its I/O base address on the bus, the device responds to the commands on the bus. As with the memory base address, it is necessary for each device to have a unique I/O base address. Similar to memory addresses, the AT bus specification allocates I/O address ranges to certain devices. Accordingly, these I/O addresses are used only by these devices. However, when other devices are added to the AT bus, each device must have its own unique I/O address. However, as with the memory base address, these devices do not have preassigned I/O addresses. Thus, the AT bus specification allocates I/O address ranges to the new devices.

However, when a new device is connected to the bus, the system does not know whether two or more devices on the bus are using the same I/O base address until the CPU runs through its initialization routine. Thus, when the CPU sends an I/O bus address to the two or more devices on the bus using the same address, the two or more devices both respond and generate a conflict on the bus.

Existing systems with EEPROM based configuration resolve conflicts in the I/O base address by a method paralleling the method for resolving an address conflict on jumper or switch based designs. In particular, for the Ethernet module with an EEPROM based configuration the user of the computer first powers on the computer. During the CPU initialization routine, when an I/O memory address conflict is detected, the user must remove the module from the first computer and insert it into a second system having no I/O base address conflicts. The user may then alter the I/O address of the module by rewriting the EEPROM. After which, the module now having its original configuration changed may be reinstalled in the original system.

The method for resolving address conflicts is labor intensive, expensive, and subject to operator error. The process requires removing a module from the first computer, inserting it into the second computer, powering it up and reconfiguring it in the second system, removing it from the second system, wires on the module, reinserting it into and retesting it in the first system, and repeating this process until all conflicts are eliminated. These steps each require labor for performing them and are thus time consuming. The added time for set up, test, and rework increase the cost of the module. Further, the multiple steps increase the likelihood of errors during rework and of damaging the module or the computer by repetitively removing and installing the module in the two computer systems.

It is desired to alter the memory and I/O address of an add-on module without jumpers and to automate and reduce the number of steps in the alteration.

SUMMARY OF THE INVENTION

Briefly, one embodiment of the invention is an interface controller for an addressable interface module. The interface module is adapted to be coupled along with other addressable interface modules over a communication bus to a central processor. Each interface module is adapted to respond to a unique base address, unique to such interface module provided by the central processor on the communication bus, and a read command provided by the central processor on the communication bus for reading data from such interface module to the communication bus or to a write command provided by the central processor for writing data from the communication bus to such interface module. The interface controller has a stored configuration base address for determining the unique address for which the corresponding interface module is to respond. The interface controller also has a decoder that decodes the base address including the modified configuration address for use by the corresponding interface module in determining the unique address for response by the corresponding interface module. The interface controller has a circuit that automatically modifies the stored configuration base address in the event the latter is the same as the unique address for one of the other interface modules. The circuit includes a second circuit responsive to a predetermined address on the communication bus and the read command for modifying the stored configuration base address to a different configuration address. In one specific implementation, the first circuit includes a counter for incrementally adjusting the value represented by the configuration base address.

Briefly, one embodiment of the invention is a method for adaptively adjusting in response to an initiating command a first identification code of a first module connected to a bus to eliminate a conflict with a second module connected to the bus. The first identification code is stored in a register. A commanded identification code is received on the bus. The stored first identification code is compared with the commanded identification code received on the bus. Data is sent on the bus in response to a match between the first identification code and the commanded identification code. Expected data is generated. The sent data is compared with the expected data, and if the sent data does not match the expected data, the result thereof is identified as a mismatch. The stored first identification code in the register is modified in response to the identified mismatch. The above process is repeated sequentially, until there is no mismatch identified between the sent data and the expected data so that the first module is uniquely identified by the first identification code.

Preferably, the bus is an IBM AT bus, the identification code is an input/output base address, and the initiating command is a hardware reset command.

A circuit is provided for adaptively adjusting in response to an initiating command a first identification code of a first module connected to a bus to avoid a conflict with a second module connected to the bus. The circuit has means for storing the first identification code; means for comparing the first identification code in the storing means to a commanded identification code; means for sending data in response to a match in the first identification code with the commanded identification code; means for detecting whether both the first module and the second module send data in response to a match in the first identification code with the commanded identification code and for generating a conflict signal when there is not a match; and means for modifying the first identification code so that the first and second modules do not both send data upon a match in the first identification code with the commanded identification code in response to the conflict signal.

In a specific embodiment, an interface module transfers data between an Industry Standard Architecture (ISA) bus and an ethernet network. The ISA bus transfers a first and second group of addresses and a reset command from a central processing unit (CPU) to the interface module and transfers data from the interface module to the CPU. The interface module has an adaptable identification address. The interface module includes a register for storing the adaptable identification address. A decoder is coupled to the register, for decoding the adaptable identification address and the first group of addresses from the CPU. A buffer memory is coupled to the decoder and the ISA bus. The buffer memory provides data to or receives data from the ISA bus in response to the first group of decoded addresses when selected addresses in the first group of decoded addresses contain the adaptable identification address. A counter modifies the adaptable identification address stored in the register in response to the second group of addresses and the reset command from the CPU.

BRIEF DESCRIPTION OF THE DRAWINGS

FIG. 11 is a map of the I/O base addresses for the AT bus.

DETAILED DESCRIPTION

Figure 1:
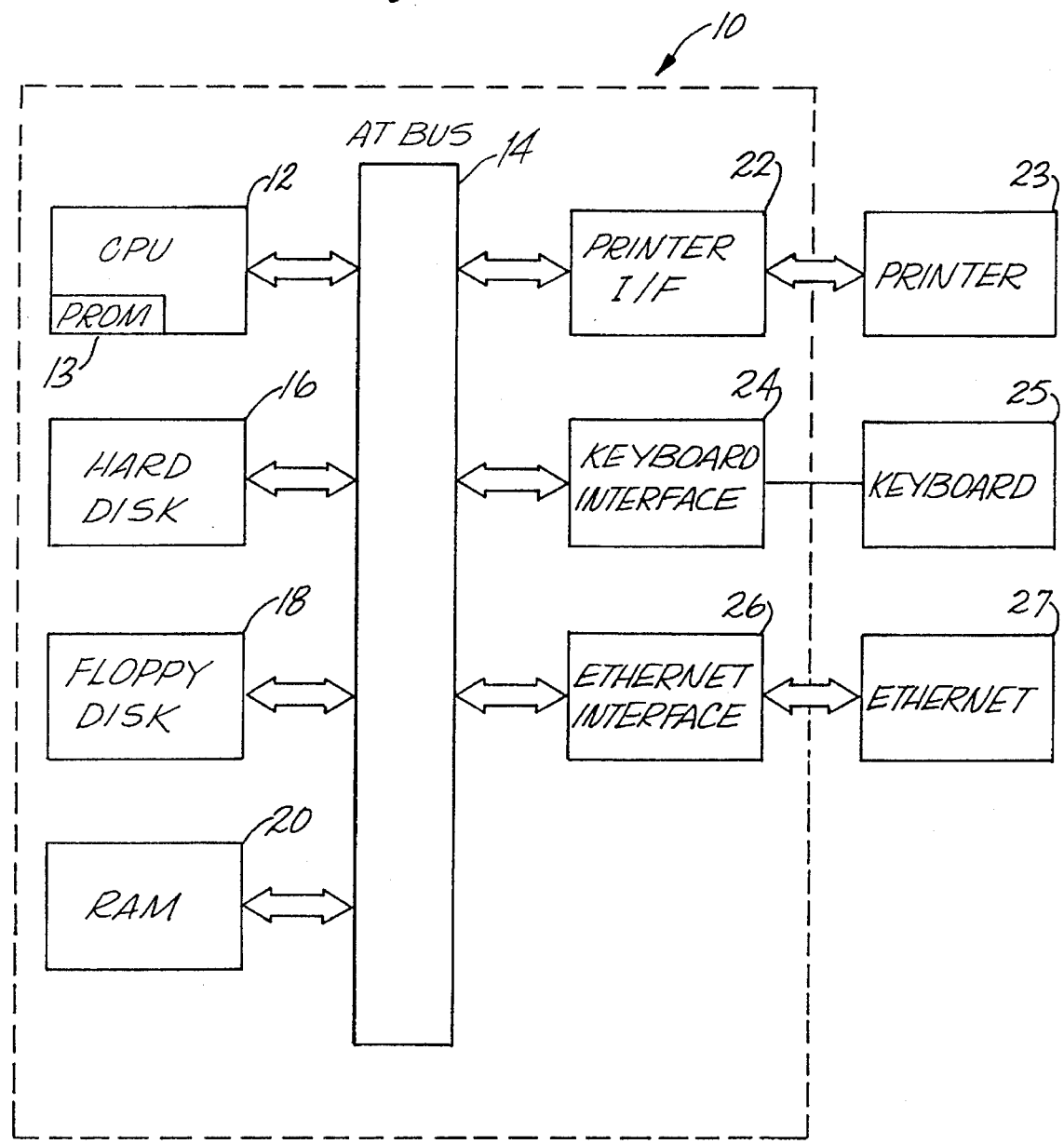
FIG. 1 shows a computer according to principles of the invention.

FIG. 1 is a functional block diagram showing a computer using an Ethernet interface module for communicating between an Ethernet and an AT bus according to principles of the invention. A computer 10 has a central processing unit (CPU) module 12 connected to an AT bus 14. The CPU 12 comprises preferably a 486 type microprocessor chip manufactured by Intel Corporation, Santa Clara, Calif. As noted above, the AT bus 14 is a standard bus used in IBM AT and AT compatible personal computers. The AT bus 14 is also connected to a plurality of memory devices including a hard disk 16, a floppy disk 18, and a random access memory (RAM) 20. Although several memory devices are shown, the invention does not require all of the devices. A printer interface module 22 is connected to the AT bus 14 and to a printer 23 that is external to the computer 10. A keyboard interface module 24 is connected to the AT bus 14 and to a keyboard 25. The keyboard 25 provides user selected commands to the computer 10. An Ethernet interface (I/F) module 26 provides an interface for communicating between the AT bus 14 and to an Ethernet network 27. Alternatively, the interface module 26 may interface to other buses. As described above, the Ethernet is a standardized communication network typically used for a Local Area Network (LAN). The Ethernet interface module 26 is preferably packaged onto one module.

The power-up sequence for IBM AT computers is well known in the art. Briefly, at power turn-on, the CPU 12 issues a hardware reset to all modules in the computer 10 to instruct each module to start an initialization routine. The CPU 12 reads instructions for a basic input/output system (BIOS) from a programmable read only (PROM) 13 located on the CPU module. After executing a plurality of initialization routines from the BIOS, the CPU 12 reads utility programs from the memory. The utility programs are previously stored into one of the memory devices, preferably the hard disk 16, and identify the modules that are expected to be connected to the AT bus 14 and execute initialization and diagnostic routines on the modules and their interfaces to the AT bus.

Figure 2:
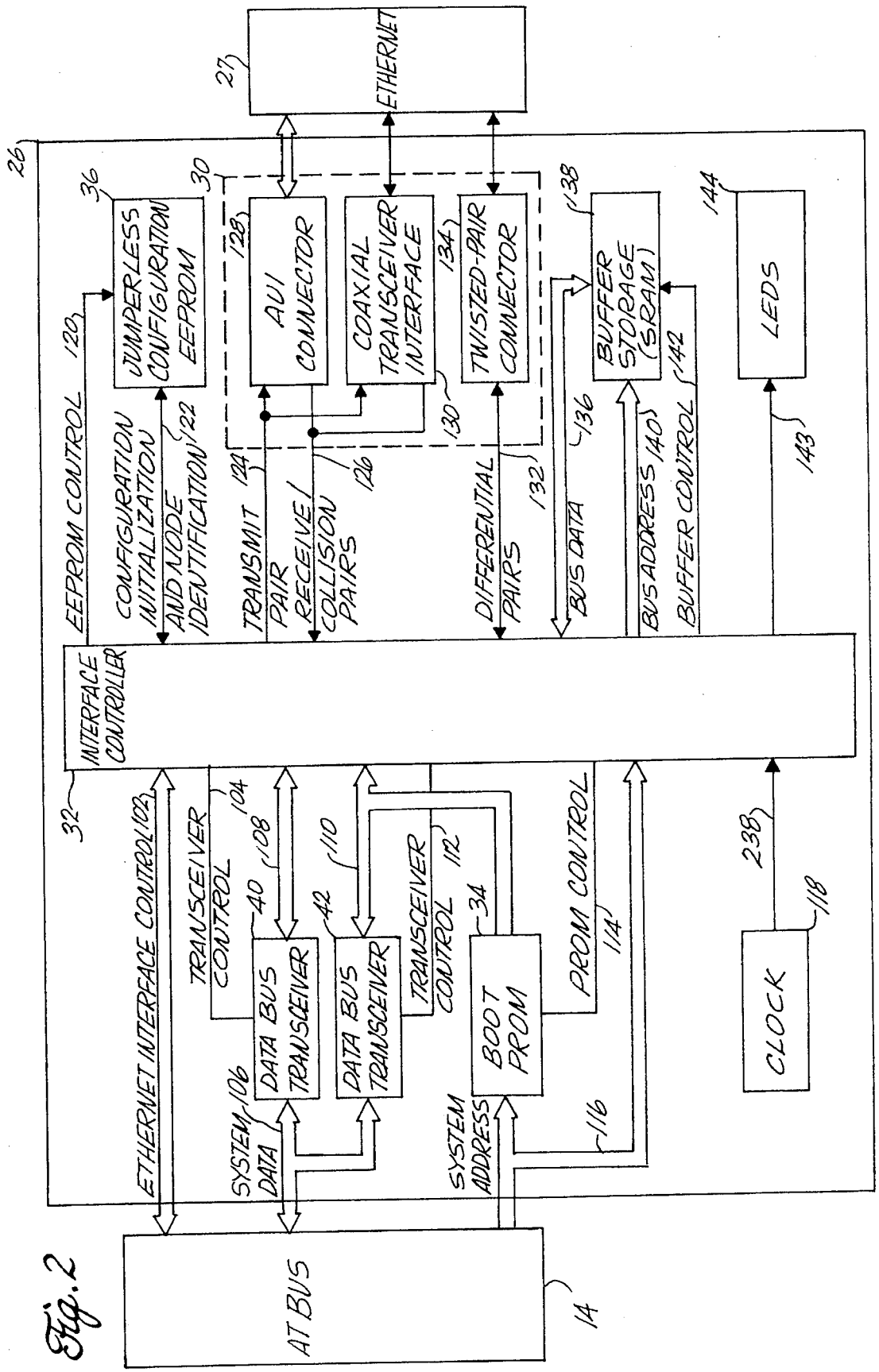
FIG. 2 is a functional block diagram of the Ethernet interface module for the computer shown in FIG. 1.

FIG. 2 is a functional block diagram of the ethernet interface module 26 for the computer shown in FIG. 1. Ethernet interface control signals are provided on a line 102 from the CPU 12 over the AT bus 14 to an interface controller 32 and in the reverse direction from the interface controller 32 to the AT bus 14. The CPU 12 provides system address commands over the AT bus 14 and on a system address bus 116 to a boot programmable read-only memory (PROM) 34 and an interface controller 32. The address of the Ethernet interface module functions as an identification code for identifying the module. Upon receipt of a commanded address that matches the address of the ethernet interface module 26, the module 26 responds to the requested function. The boot PROM 34 contains the bootup program for the Ethernet interface module 26. The boot PROM 34 may be used in a diskless system, e.g., no hard disk 16 or floppy disk 18, where the driver program is loaded from the Ethernet 27. The interface controller 32 provides the control circuits for interfacing between the AT bus 14 and the Ethernet 27. The interface controller 32 provides PROM control signals on a line 114 to enable the boot PROM 34 and control its output. The boot PROM 34 provides data to the interface controller 32 on a bus 110.

The CPU 12 provides system data in a first direction on the AT bus 14 and then a system data bus 106 to both a system data bus high byte transceiver 40 and a system data bus low byte transceiver 42 for a 16 bit AT bus 14 or to only the system data bus low byte transceiver 42 for an 8 bit AT bus 14. In addition, commands and status transfers are provided over the system data bus 106. Conversely, the CPU 12 receives system data in a second direction on the system data bus 106 and then on the AT bus 14 from either both the system data bus high byte transceiver 40 and the system data bus low byte transceiver 42 for a 16 bit AT bus 14 or from only the system data bus low byte transceiver 42 for an 8 bit AT bus 14. The system data bus high byte transceiver 40 selectively provides data on a bus 108 to the interface controller 32 or in the reverse direction receives data from the interface controller 32. The interface controller 32 provides transceiver control signals on a line 104 to control the data transmission through the system data bus high byte transceiver 40. In a similar manner, the system data bus low byte transceiver 42 selectively provides data on the bus 110 to the interface controller 32 or in the reverse direction receives data from the interface controller 32. The interface controller 32 provides transceiver control signals on a line 112 to control the data transmission through the system data bus low byte transceiver 42.

A clock 118 provides clock signals on a line 238 to the interface controller 32. The interface controller 32 provides on a line 143 control signals to light emitting diodes (LEDs) 144 which provide visual indications of the status of the ethernet interface module 26. For example, the LEDs 144 may indicate receive, transmit, collision, and link test pass. An ID memory 36 provides jumperless configuration and node identification information on a line 122 to the interface controller 32 in response to ID memory control signals on a line 120 therefrom. In a boot PROM configuration, the ID memory 36 provides storage for boot PROM addresses. The ID memory 36 is preferably an electrically erasable programmable read only memory (EEPROM). In an alternate embodiment, the configuration and node identification may be stored in an ID PROM which provides this data directly to the buses 108, 110. The interface controller 32 provides buffer control signals 142 and buffer storage bus address signals 140 to a buffer storage memory 138, preferably a static random access memory (SRAM), which provides memory storage for data being transferred over a data bus 136 between the AT bus 14 and the Ethernet 27. The SRAM 138 is typically 8 or 32 kilobytes.

A connector interface 30 has several types of mechanical connectors for electrically connecting the Ethernet interface module 26 to the ethernet 27. In particular, the ethernet interface module 26 has an Attachment Unit Interface (AUI) connector 128 for an AUI interface, a coaxial transceiver interface 130 for communicating signals on a coaxial line, and a twisted-pair connector 134 for a twisted-pair interface. The interface controller 32 provides a transmit pair signal on a line 124 to both the AUI connector 128 and the coaxial transceiver interface 130. The AUI connector 128 and the coaxial transceiver interface 130 each provide receive/collision pairs signals on a line 126 to the interface controller 32. The interface controller 32 and the twisted-pair connector 134 communicate with each other by sending differential pairs signals on a line 132.

Figure 3:
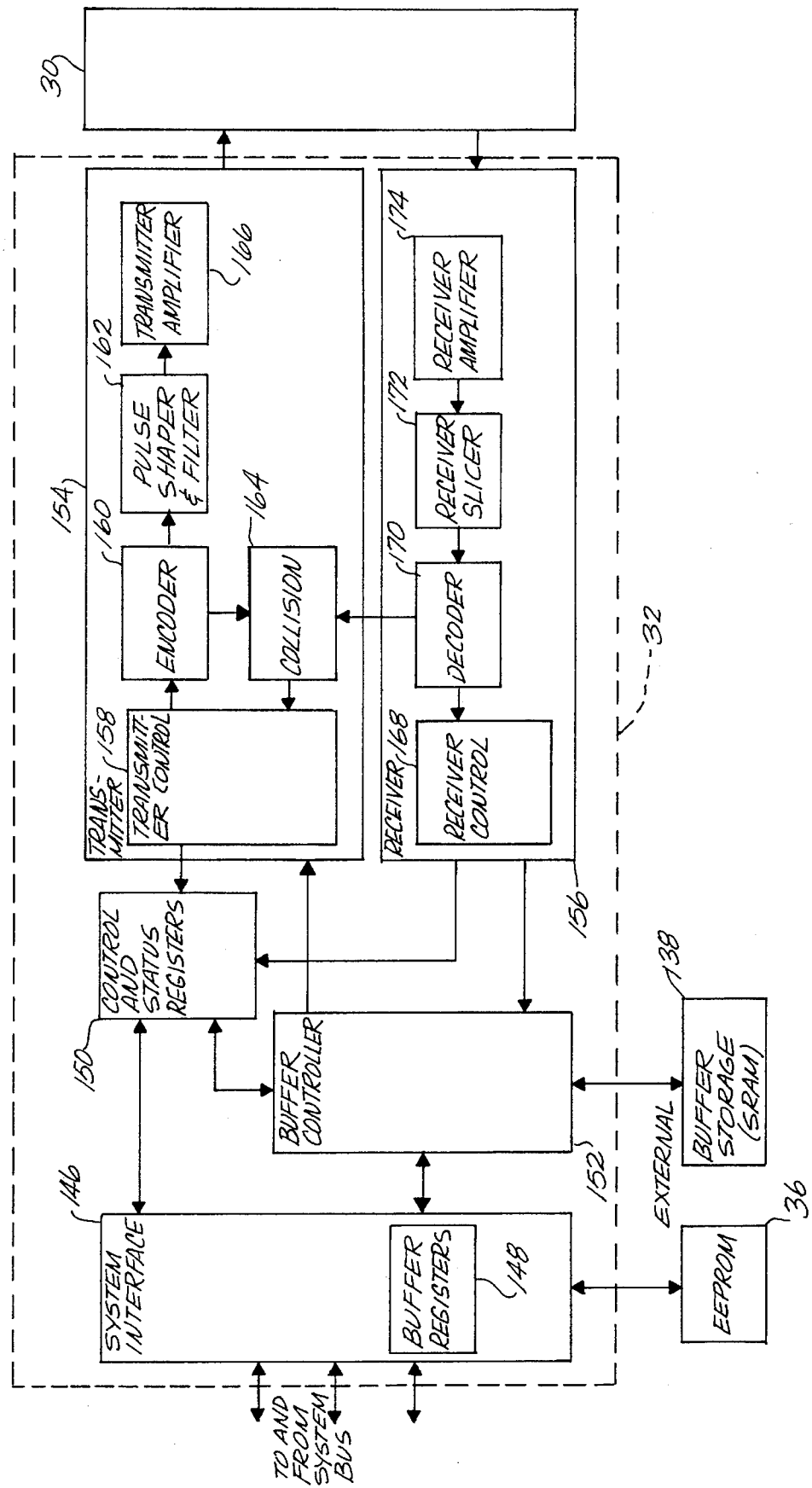
FIG. 3 is a functional block diagram of the interface controller shown in FIG. 2.

FIG. 3 is a functional block diagram of the interface controller shown in FIG. 2. The interface controller 32 comprises five functional blocks: a system interface 146, a buffer controller 152, control and status registers 150, a transmitter 154, and a receiver 156.

The system interface 146 communicates with the AT bus 14 using signals on the lines 102, 104, 108, 110, 112, 114 and 116 as described above. The system interface 146 has buffer registers 148 for holding data during the communication between the AT bus 14 and the ethernet 27. The system interface 146 bi-directionally communicates with a buffer controller 152 which controls the transfer of data between the buffer controller 152 and the buffer registers 148, the ID memory 36, the SRAM 138, the receiver 156, and the transmitter 154. The control and status registers 150 receive control and status information from the system interface 146, the buffer controller 152, the transmitter 154, and the receiver 156 and transmits control and status information to the system interface 146 and the buffer controller 152.

The transmitter 154 has a transmitter controller 158 for controlling the encoding of data from the buffer controller 152 in an encoder 160. The encoded data is processed by a pulse shaper and filter 162, then amplified in a transmitter amplifier 166, and provided to the connector interface 30 (see FIG. 2). Conversely, the receiver 156 receives a data signal from the connector interface 30 and amplifies it in a receiver amplifier 174. The amplified data signal is processed in a receiver slicer 172 and then decoded by a decoder 170. The decoded data signal is then provided to a receiver controller 168 and then to the buffer controller 152. A collision circuit 164 resolves collisions between the transmissions and receptions on the ethernet 27 by processing decoded signals from the decoder 170 and encoded signals from the encoder 160.

Figure 4:
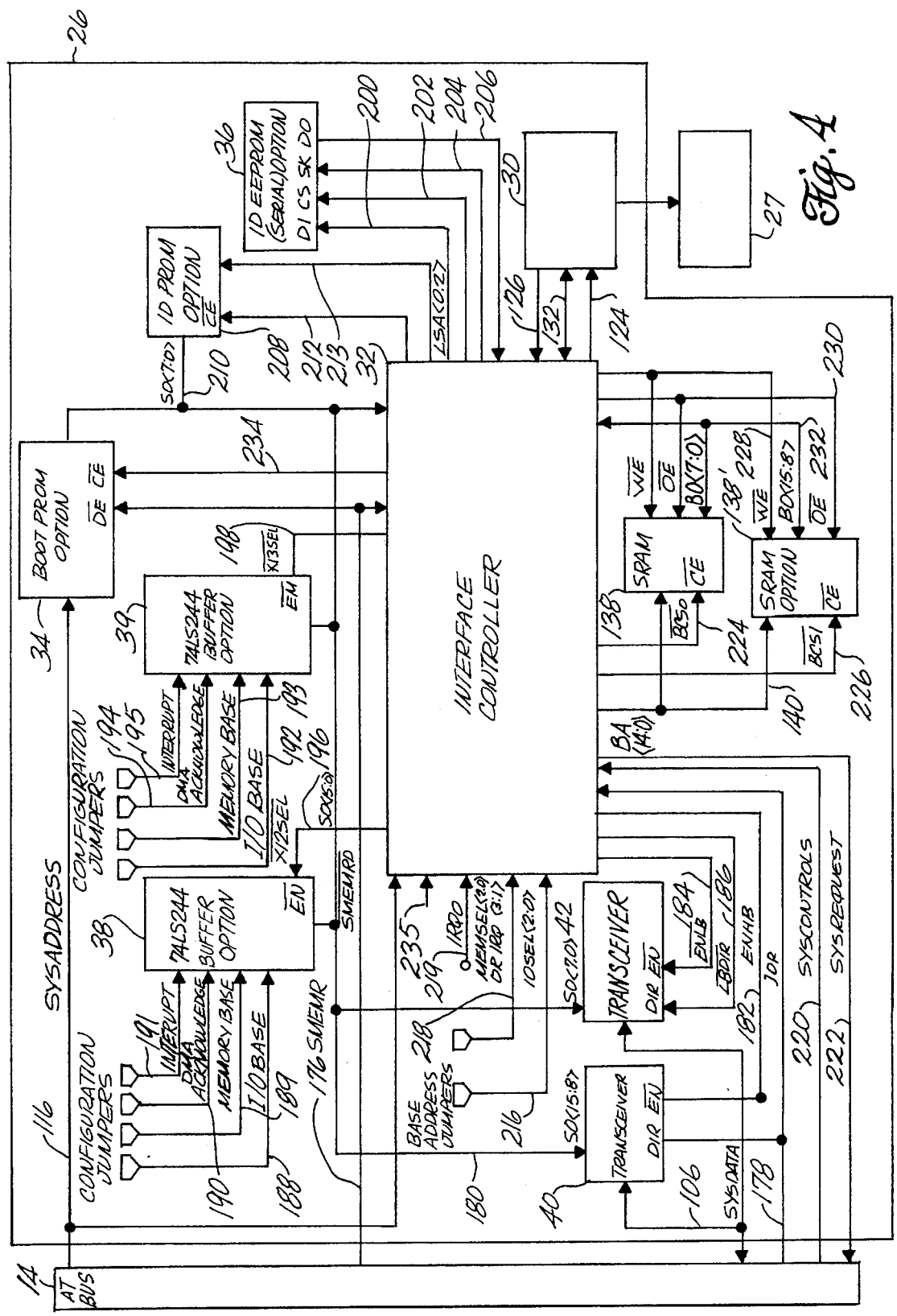
FIG. 4 is a functional block diagram of a specific implementation of the Ethernet interface module for the computer shown in FIG. 1.

FIG. 4 is a functional block diagram of a specific implementation of the Ethernet interface module 26 for the computer 10 shown in FIG. 1.

The CPU 12 provides a System Address (SYSADDRESS) signal across the AT bus 14 to the Ethernet interface module 26 and the other modules on the AT bus 14. In particular, on the Ethernet interface module 26, the SYSADDRESS signal is provided on the line 116 to address inputs of both the Boot PROM 34 and the interface controller 32. The CPU 12 sends these System Address commands to define the memory address space and the I/O address space. The addressing will be described in detail below in conjunction with FIGS. 9–12. The AT bus 14 also provides a System Memory Read ($\overline{\text{SMEMR}}$) command on a line 176, which is part of the Ethernet interface control signal line 102 (FIG. 2), to both an Output Enable ($\overline{\text{OE}}$) input of the Boot PROM 34 and to the interface controller 32. (The convention of an overscore of a signal name indicates that the signal is asserted in a low state). The $\overline{\text{SMEMR}}$ command is an active low signal from the AT bus 14 which indicates that the current bus cycle is a memory read operation and requests the Ethernet interface module 26 to output data from the memory onto the AT bus 14. Although commands are described herein as active low or high signals, the invention is not so limited. The Ethernet interface module 26 may be designed with either active low or active high signals.

The CPU 12 also provides all data, commands, and status transfers over the system data (SYSDATA) bus 106, or commands other devices on the AT bus 14 to provide the same, to the Ethernet interface module 26. In particular, the SYSDATA bus lines 106 are provided on the AT bus 14 to a first bi-directional input/output terminal of both the system data bus high byte transceiver 40 and the system data bus low byte transceiver 42. Both the system data bus high byte transceiver 40 and the system data bus low byte transceiver 42 operate in a similar manner except the CPU 12 controls the direction of data flow through the former while the interface controller 32 controls the direction of data flow through the latter. The system data bus high byte transceiver 40 receives an Input/Output Read ($\overline{\text{IOR}}$) command on a line 178 from the CPU 12 on the AT bus 14 via the direction control (DIR) input terminal of the transceiver. An active high signal on the DIR input terminal switches the system data bus low byte transceiver 40 to transfer data from the system data bus 106 to a buffer system data (BSD) bus 180 (which comprises the buses 108, 110 (FIG. 2)), that is an internal data bus on the ethernet interface module 26 for a write operation. An active low signal on the DIR input terminal switches the transceiver 40 to transfer data in the opposite direction from the BSD bus to the system data bus for a read operation. The $\overline{\text{IOR}}$ command is an active low signal from the CPU 12 which indicates that the current bus cycle is an I/O read operation and requests the Ethernet interface 26 to output data onto the system data bus 106 of the AT bus 14.

The buffer system data bus (BSD<15:0>) 180 interconnects the Boot PROM 34, the system data bus high byte transceiver 40, the system data bus low byte transceiver 42, and the controller chip 32. (The convention of defining bits on a signal line used herein is to enclose the bit numbers in <> symbols separated by a colon. For example, BSD <15:0> refers to bits 15–0 of the BSD bus.) The system data bus transceivers 40, 42 are preferably 74ALS245 tri-state bus transceivers. The output of the jumper buffers 38, 39 is also provided on the BSD bus <15:0> 180 to second bi-directional input/output terminals of the system data bus high byte transceiver 40 and the system data bus low byte transceiver 42.

The interface controller 32 provides an Enable Data High Byte ($\overline{\text{ENHB}}$) command on a line 182 to the Enable ($\overline{\text{EN}}$) input of the system data bus high byte transceiver 40. The Enable Data High Byte Signal is an active low signal which enables or disables the system data bus high byte transceiver 40. More specifically, the Enable Data High Byte command disables the system data bus high byte transceiver 40 to isolate the SYSDATA bus 106 from the buffer system data bus 180.

For control of system data flow by the ethernet interface module 26, the system data bus low byte transceiver 42 is controlled in a similar manner. However, both control signals for the system data bus low byte transceiver 42 are provided by the interface controller 32. In particular, the Ethernet interface module 26 outputs data onto the System Data bus 106 by enabling the system data bus low byte transceiver 42 with an Enable Data Low Byte Signal ($\overline{\text{ENLB}}$) on a line 184 and controlling by sending a Low Byte Direction ($\overline{\text{LBDIR}}$) Signal on a line 186 the direction of data flow from the Buffer System Data bus 180 to the System Data bus 106.

As will be described in detail below, the ethernet interface module 26 may operate either in a jumper or jumperless mode. In the jumper mode, the configuration of the module is defined by configuration jumpers 188–195 which are physical wires on the module. Jumpers 188, 192 define the I/O base address; jumpers 189, 193 define the memory base address; jumpers 190, 194 define DMA (Direct Memory Access) Acknowledge (DACK); and jumpers 191, 195 define the interrupts. The DACK signal is an active low signal that indicates an external DMA Controller (not shown) is ready to transfer data between the host system and the ethernet interface buffer memory. The I/O base address, the memory base address, and the interrupt signals will be defined below in conjunction with FIGS. 9–12. The configuration jumpers are connected on one end either to ground or to a voltage source (VCC) (not shown) and are connected on the other end to the inputs of the configuration jumper buffers 38, 39. Alternatively, the configuration jumpers 192–195 may be used to define configurations other than those described above. A set of mode jumpers 235 are provided to the interface controller 32 which define whether an EEPROM or ID PROM stores the initial parameters and whether operation is a jumper or jumperless operation.

In the jumper mode, the logic level of each of the configuration jumpers is provided to the buffer system data bus 180. When the Ethernet interface module 26 wants to read the status of the configuration jumpers, the interface controller 32 provides a Select Configuration Register 1 command (SEL12) on a line 196 to the Enable ($\overline{EN}$) input of the jumper buffer 38, which in response provides the configuration jumper signals to the Buffer System Data bus 180. The SEL12 command is not used in the jumperless mode. Alternatively, the jumper buffer 39 is enabled by a Select Configuration Register 2 command (SEL13) on a line 198 provided from the interface controller 32 to the Enable ($\overline{EN}$) input of the configuration jumper buffer 39. As will be described below, the SEL13 command is used in the jumperless mode to read from the shift register/counter 48. The configuration jumper buffers 38, 39 are preferably 74LS244 tri-state buffers. A logic 1 level for either the SEL12 signal on the line 196 or SEL13 signal on the line 198 switches the corresponding buffer output into a high impedance state and isolates the jumpered input from the output to the bus. Conversely, a logic 0 level for either the SEL12 command 196 or SEL13 command 198 switches the corresponding buffer 38, 39, respectively, to provide signals corresponding to the configuration jumpers 188–195 to the buffer system data bus 180.

The ID memory 36 stores the configuration byte for the Ethernet interface module 26. The ID memory 36 is preferably a serial EEPROM, such as a National Semiconductor NMC93C06, C26, or C46 series having 256, 512, or 1024 bits, respectively. The serial EEPROM has three inputs: a serial data input, a serial data clock or shift clock (SK) and a chip select (CS) from the interface controller 32. The ID memory 36 provides a single output, a serial data output (DO), on a line 206 to the interface controller 32. The instruction, address, and write data are all provided as a ID memory 36 input on a line 200 to an input terminal of the ID memory 36. Read data and status information of the serial EEPROM are outputted from the serial data output terminal. The interface controller 32 provides a chip select signal on a line 202 to the ID memory 36. The serial EEPROM shifts data in or out on low-to-high transitions of a shift clock (SK) on a line 204 from the interface controller 32.

In an alternate embodiment, an ID prom 208 provides on a line 210 data to and receives data from the buffer system data bus 180. The interface controller 32 provides a PROM chip select signal on a line 212 to enable the ID PROM 208 and latched address signals on a line 213 to address the ID PROM 36.

The buffer storage memory 138 (also referred to as SRAM138) and an optional additional buffer storage memory 138', receive address signals 140 from the interface controller 32 for selecting memory locations in the memory. The interface controller 32 provides buffer chip select signals on lines 224 and 226 to chip enable input terminals on the SRAMS 138 and 138', respectively, to enable the selected chip. The interface controller 32 also provides on a line 228 a write enable ($\overline{WE}$) signal and on a line 230 an output enable ($\overline{OE}$) to both SRAMS 138, 138'. Buffer data is bidirectionally communicated on a bus 232 between the SRAMS 138, 138' and the interface controller 32. Bit 7–0 of the buffer data are provided to the SRAM 138. Bits 15–8 of the buffer data are provided to the SRAM 138'.

The interface controller 32 and the connector interface 30 communicate over lines 124, 126, 132 described above. The connector interface 30 is coupled to the Ethernet 27. The interface controller 32 provides system requests on a line 222 to the AT bus 14 and receives system control signals on a line 220 from the AT bus 14. Lines 220, 222 are part of the line 102 (FIG. 2)

I/O base address jumpers may be connected to a line 216 to replace bits 2–0 of the configuration byte for defining the I/O base address in a jumper mode. Similarly, memory base address jumpers may be connected to a line 218 to replace bits 5–3 of the memory base address or bits 7–6 of the interrupt request (to be described below). Interrupt request 0 is provided on a line 214 to the interface controller 32.

Figure 5:
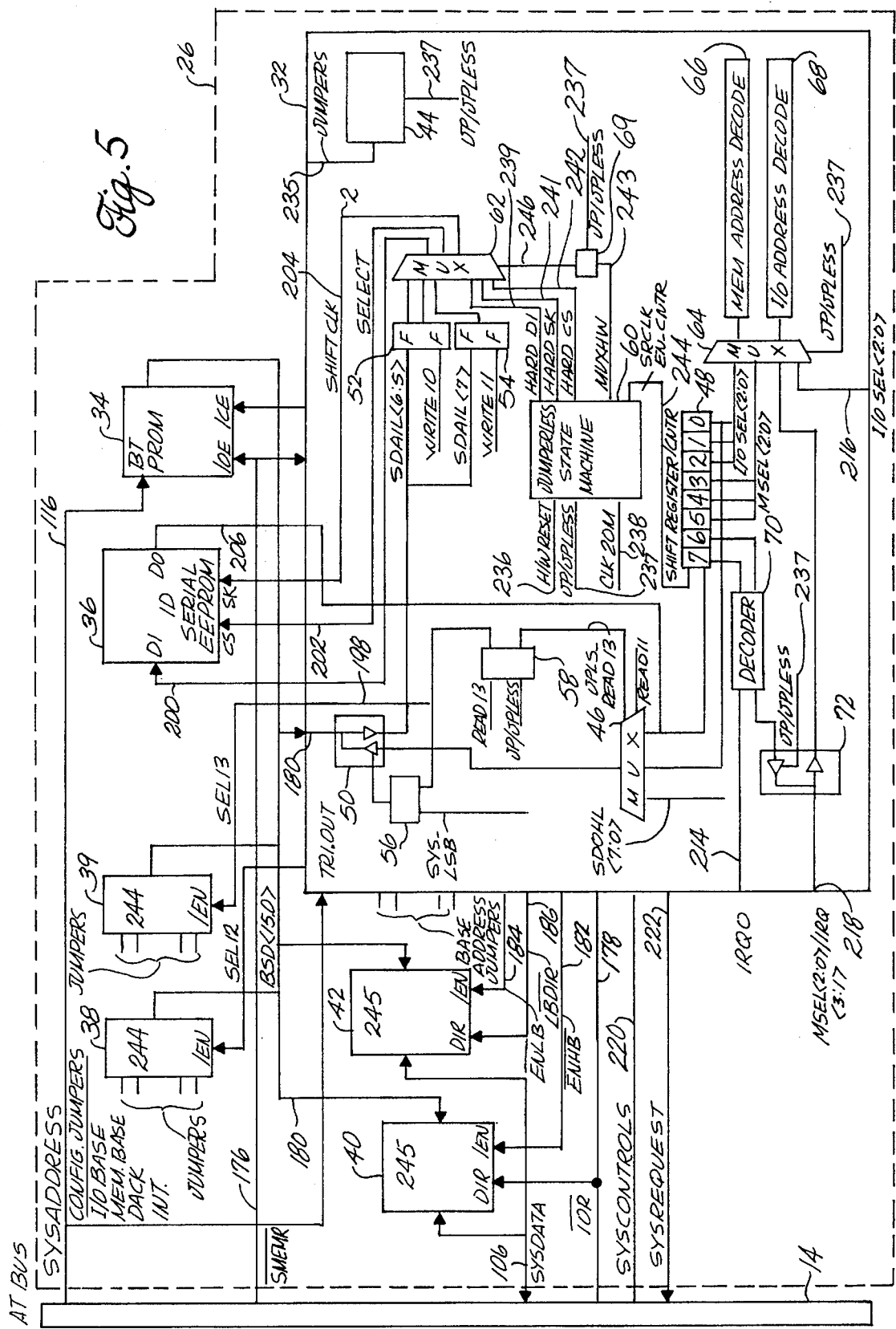
FIG. 5 is a functional block diagram of address decoding and configuration byte processing circuits of the interface controller shown in FIG. 4.

FIG. 5 is a functional block diagram of address decoding and configuration byte processing circuits of the interface controller shown in FIG. 4.

A jumper mode decoder 44 has mode jumpers 235 which have first and second inputs (shown collectively as line 235) which are selectively connected to either ground or a voltage source (VCC) (not shown). One output of the jumper mode decoder 44 is a jumper/jumperless (JP/JPLESS) signal on a line 237 that indicates to the interface controller 32 whether the module is to be reconfigured either by changing jumper wires or by software as will be explained below. For example, by connecting the second input 235 to the voltage source (VCC), the JP/JPLESS signal on the line 237 is a logic 1 indicating that the module is operating in the jumperless-mode. Conversely, by connecting the first input 237 to ground, the JP/JPLESS signal is a logic 0 indicating that the module is operating in the jumper mode.

The serial data output on the line 206 from the ID memory 36 is provided to both a first input of a data selection multiplexer (MUX) 46 and a shift register/counter 48 in the interface controller 32. The shift register/counter 48 includes an eight bit serial in/parallel out shift register having bits 7 through 0. Bits 2–0 (also referred to as I/O SEL <2:0>) define the I/O base address. Bits 5–3 (also referred to as MSEL <2:0>) define the memory base address. Bits 7–6 (also referred to as IRQ <3:0>) define the interrupt line configuration. The decoding of these bits will be described in detail below. The shift register/counter 48 also functions as a counter for bits 2–0 as will be described below.

The data selection MUX 46 selectively controls the data that is provided to the BSD bus 180. Bits 7–0 of the shift register/counter 48 are also connected to a second input of the data selection MUX 46. The System Data Output High/Low bus (SDOHL<7:0>) signal, which is a bus internal to the interface controller 32 and interconnects the system interface 146, the control and status registers 150, the buffer controller 152, the transmitter 154, and the receiver 156 (FIG. 3), is provided to a third input of the data selection MUX 46.

Figure 6:
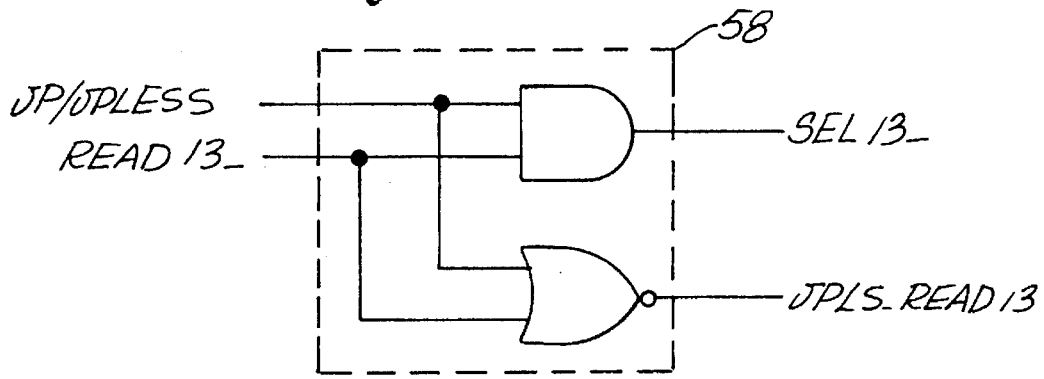
FIG. 6 is a schematic diagram of a control logic circuit for controlling the data provided by the data selection MUX to the buffer system data bus.

The signals provided by the data selection MUX 46 are controlled by a control logic circuit 58. FIG. 6 is a schematic diagram of a control logic circuit for controlling the data provided by the data selection MUX to the buffer system data bus. A jumper/jumperless (JP/JPLESS) signal on the line 237 is provided by the jumper mode decoder 44 to a first input of the control logic circuit 58. A READ 13 command to read address 13 of the buffer registers 148 (FIG. 3) is provided to a second input of the control logic circuit 58. The JP/JPLESS signal and the READ 13_ are NOR'ed in the control logic circuit 58 to produce a JPLS_READ 13 signal which is provided to the data selection MUX 46.

A READ 11 command to read the data output from the ID memory 36 is also provided to the data selection MUX 46. Table I shows the truth table for the output selected for the data selection MUX 46.

TABLE I

| READ 11 | JPLS_READ 13 | DATA OUT FROM MUX 46 |
|---|---|---|
| 1 | 0 | Do |
| 0 | 1 | Shift register/ counter 48 <7:0> |
| 0 | 0 | SDOHL <7:0> |

The output of the data selection MUX 46 is connected to a bi-directional tri-state buffer 50. The bi-directional input/output port of the bi-directional tristate buffer 50 is connected to the buffer system data bus (BSD <15:0>) 180 as described above. The bi-directional tri-state buffer 50 selectively controls the direction of data flow between the buffer system data bus 180 and the interface controller 32. The single direction output from the bi-directional tri-state buffer 50 is connected to a flip flop 52 and 54 by the System Data Input Low (SDAIL <6:5>) signal and SDAIL <7> signal, respectively. The direction of data flow in the bi-directional tri-state buffer 50 is controlled by a control logic circuit 56.

Figure 7:
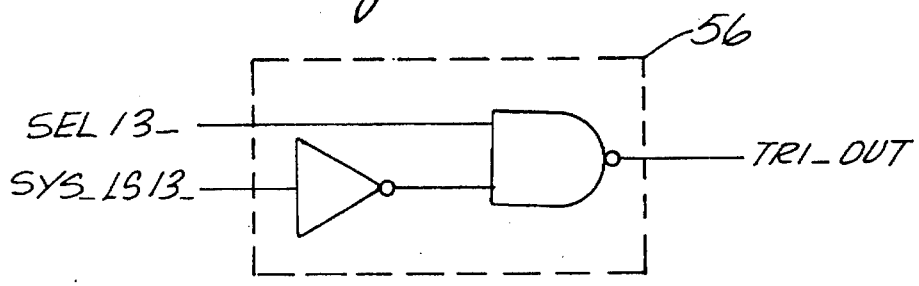
FIG. 7 is a schematic diagram of the control logic circuit for controlling the bi-directional tri-state buffer.

FIG. 7 is a schematic diagram of the control logic circuit for controlling the bi-directional tri-state buffer. Referring to FIG. 6, the control logic circuit 58 AND's the JP/JPLESS signal and the READ 13_signal together to produce a SEL 13_signal that is provided to both the configuration jumper buffer 39 and the control logic circuit 56. Referring now to FIG. 7, the SEL 13_signal is NAND'ed with the inversion of a System Least Significant Bit (SYS_LSB_) signal to produce a Tri_Out signal that commands data to flow from the interface controller 32 to the BSD bus 180 in a first logic state, e.g. a logic "1" and conversely commands data to flow from the BSD bus 180 into the interface controller 32 in a second logic state, e.g. a logic "0". The SYS_LSB_signal is provided by an internal FIFO or register (not shown) and is a qualifier. Therefore, the data selection MUX 46 is selected to output data onto the BSD line 180 from either the ID memory 36, the shift register/counter 48, or the SDOHL bus.

A Hardware Reset signal on a line 236, the JP/JPLESS signal on a line 237, and a 20 MHz clock are provided to first, second, and third inputs of a jumperless state machine 60. The Ethernet interface module 26 operates on a 20 MHz clock signal on a line 238 from the clock 118 (FIG. 2). A first output signal, Enable Counter (EN CNTR), of the jumperless state machine 60 is provided on a line 244 to the shift register/counter 48 to command the shift register/counter 48 to operate as either a shift register or a counter. In addition, a shift register clock (SRCLK) signal is also provided for shifting data in the shift register/counter 48. The jumperless state machine 60 provides on a line 239 a hardware controlled data in (HARD DI) signal from a second output to an ID memory control MUX 62 which selectively provides the signal on the line 200 to the ID memory 36. The jumperless state machine 60 provides on a line 241 a hardware controlled shift clock (HARD SK) signal from a third output to the ID memory control MUX 62 which selectively provides the signal on the line 204 to the ID memory 36. The jumperless state machine 60 provides on a line 242 a hardware controlled chip select (HARD CS) signal from a fourth output to the ID memory control MUX 62 which selectively provides the signal on the line 202 to the ID memory 36. The jumperless state machine 60 provides on a line 243 a MUX hardware select (MUXHW) signal from a fifth output to a ID memory MUX control circuit 69.

Figure 8:
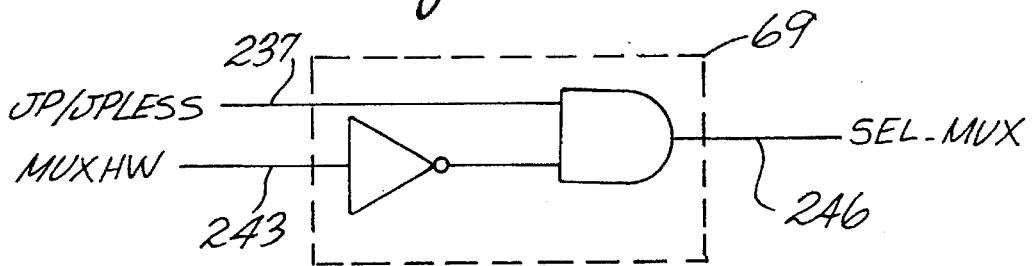
FIG. 8 is a schematic diagram of the ID memory MUX control circuit shown in FIG. 5.

FIG. 8 is a schematic diagram of the ID memory MUX control circuit shown in FIG. 5. The MUXHW signal is provided on the line 243 to the ID memory MUX control circuit 69 where it is inverted and AND'ed with the JP/JPLESS signal to form a SEL_MUX signal. Referring back to FIG. 5, the SEL_MUX signal is provided on a line 246 to the ID memory control MUX 62 to select between providing either signals from the jumperless state machine 60 to the ID memory 36 or signals from flip flops 52, 54.

Software controlled chip select, shift clock, and data in signals are provided to the flip flops 52, 54. In particular, SDAIL <6:5> and SDAIL <7> are provided from the buffer system data bus 180 to the flip flops 52, 54, respectively, as described above. A WRITE 10 signal and a WRITE 11 signal are also provided to the flip flops 52, 54, respectively.

Bits 2–0 of the shift register/counter 48 are connected to a first input of a decoder selection MUX 64 as I/OSEL <2:0>. Bits 5–3 of the shift register/counter 48 are provided as signal MSEL <2:0> to a second input of the decoder selection MUX 64. An I/OSEL <2:0> command defined by jumpers is provided on the line 216 to a third input of the decoder selection MUX 64. The fourth input of the decoder selection MUX 64 is connected to a bi-directional tri-state buffer 72. The bi-directional port of the bi-directional tri-state buffer 72 is connected to a signal line carrying as an input an MSEL <2:0> command defined by jumpers or as an output an interrupt request (IRQ <3:0>) signal. The input to the bi-directional tristate buffer 72 is a first output of an interrupt request decoder 70. A second output of the interrupt request decoder 70 is an interrupt request 0. Bits 7–6 of the shift register/counter 48 are also provided to two inputs of the interrupt request decoder 70. The bi-directional tri-state buffer 72 is controlled by the JP/JPLESS command on the line 237 from the jumper decoder 44. The outputs of the decoder selection MUX 64 are connected to a memory address decoder 66 and an I/O address decoder 68. The outputs of the memory address decoder 66 and the I/O address decoder 68 are connected to the SRAM 138 (FIG. 3). The decoder selection MUX 64 is also controlled by the JP/JPLESS command from the jumper decoder 44. The decoder selection MUX 64 is switched between outputting MSEL<2:0>and I/OSEL<2:0> from the shift register/counter 48 or the jumpers in response to a JP/JPLESS command of a logic 1 or logic 0, respectively.

Figure 9:
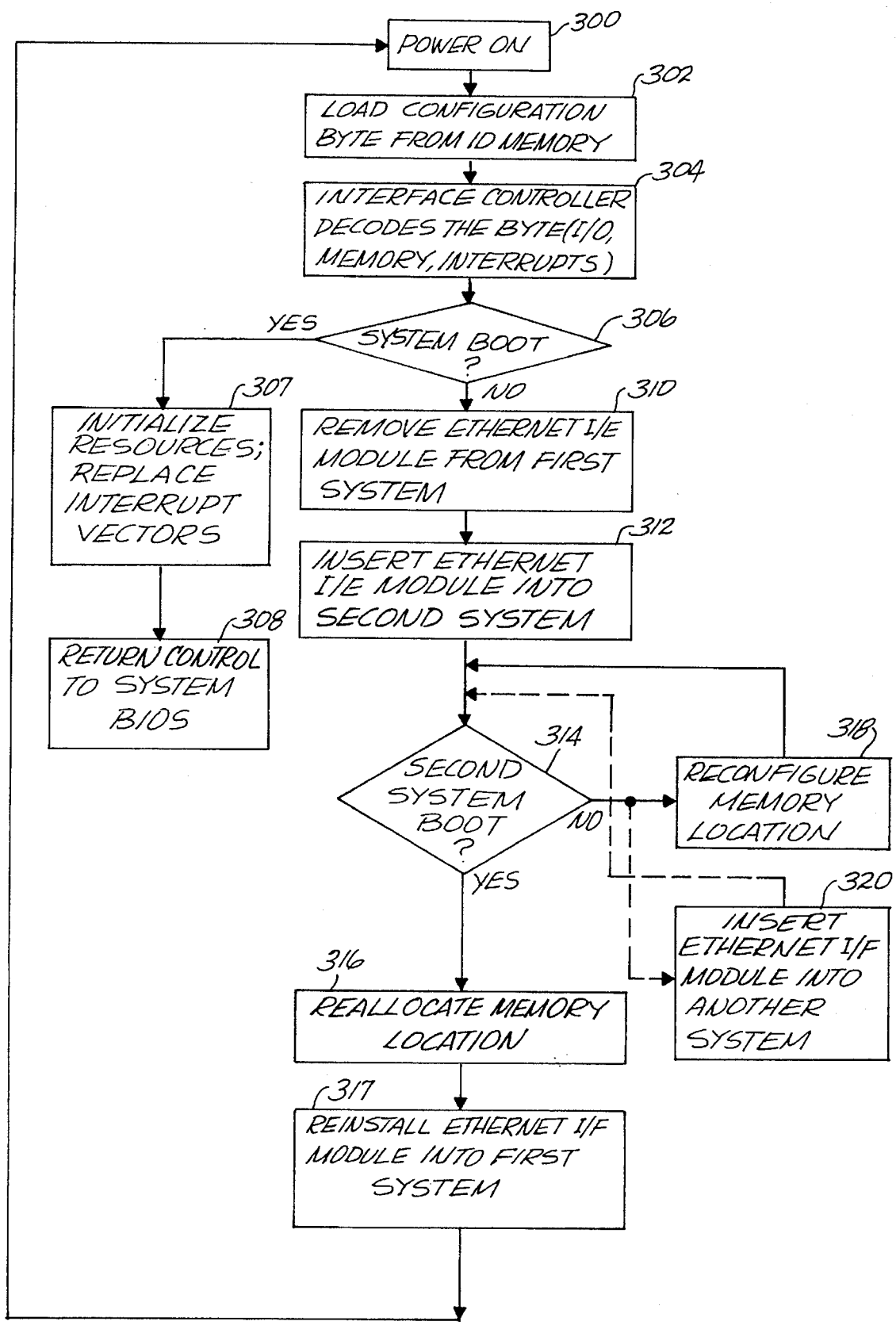
FIG. 9 is a flow chart of the reading of a configuration byte from an ID memory to a shift register/counter at system power up or at any other time when a System Hardware Reset command is issued and resolving boot memory conflicts.

With the hardware now defined, the operation of the Ethernet interface module 26 is now described by reference to FIGS. 9–12. FIG. 9 is a flow chart of the reading of a configuration byte from an ID memory to a shift register/counter at system power up or at any other time when a System Hardware Reset command is issued and resolving memory address conflicts. Upon power up (step 300), the CPU 12 issues a system hardware reset command, as an initiating or initializing command, to the modules on the AT bus 14 including the Ethernet interface module 26. After reset, the CPU 12 becomes the first AT bus owner. A hardware reset command may also be issued during normal system operation, for example, by the user simultaneously pressing control (Ctrl), ALT, and delete (Del) keys on the keyboard 25. The following discussion will describe the operation of the system in terms of hardware resets issued during power up for exemplary purposes. However, the invention is not so limited.

Upon a hardware reset, the jumperless state machine 60 determines whether the JP/JPLESS signal from the jumper decoder 44 (FIG. 5) indicates that the system is to be configured as a jumpered system or as a jumperless system. The operation of the Ethernet interface module 26 as a jumperless module will be first described.

If the system is a jumperless system, the jumperless state machine 60 (FIG. 5) commands the ID memory control MUX 62 to select the ID memory 36 by setting the Chip Select signal on the line 202 (FIG. 4) to a high state. The Shift Clock command on the line 204 (FIG. 4) is set to shift data from the ID memory 36 on the serial data output 206 to the shift register/counter 48. The jumperless state machine 60 also sends a command on the line 244 (FIG. 5) to the shift register/counter 48 to command the shift register/counter 48 to operate as a shift register and to clock in the serial data output 206 from the ID memory 36.

Figure 10:
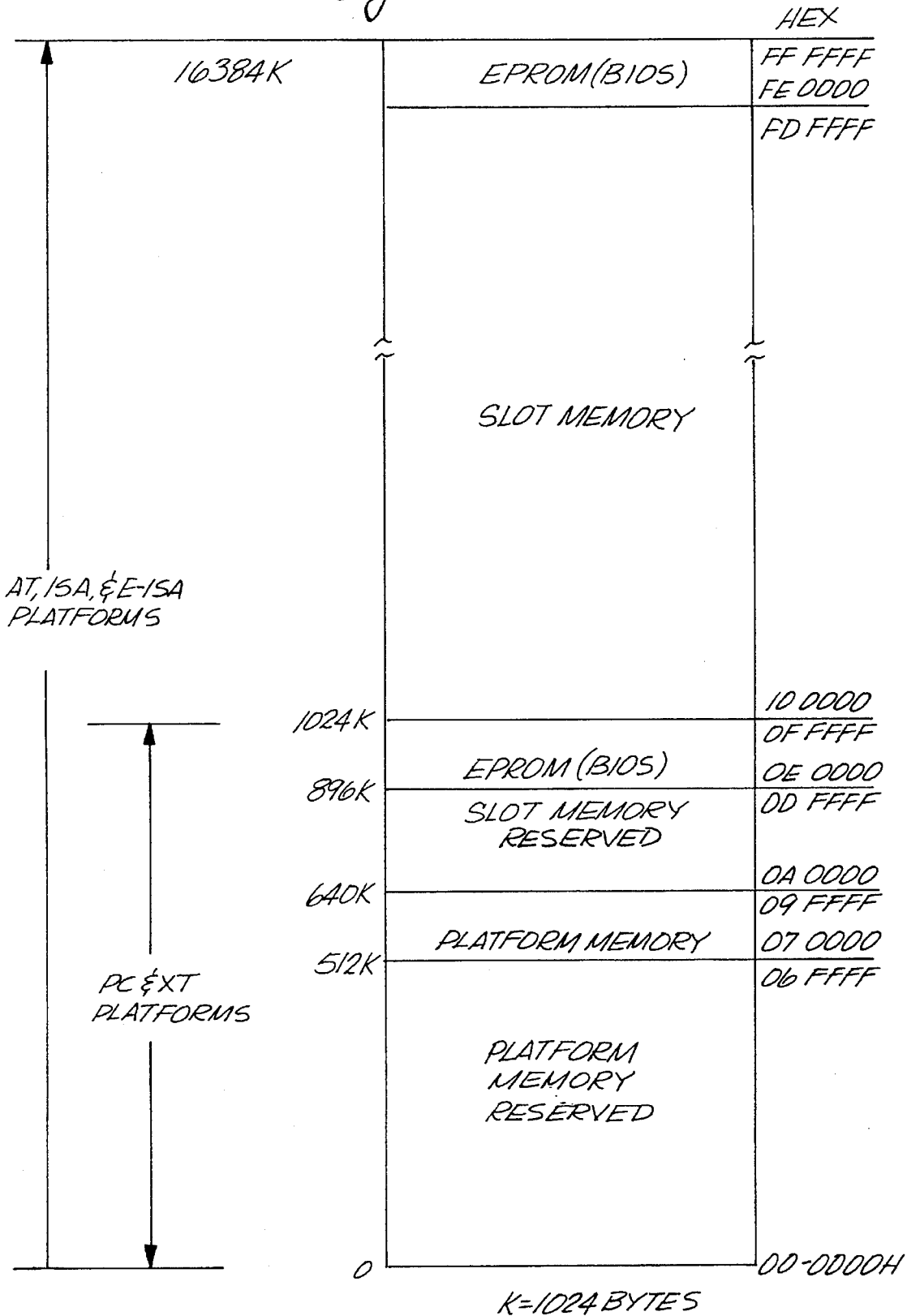
FIG. 10 is a map of the memory base addresses for the AT bus.

The jumperless state machine 60 generates appropriate signals to read a configuration byte from location 0x11 of the ID memory 36 and load it into the shift register/counter 48 (step 302). As described above, bits 5–3 determine the memory base address (step 304). FIG. 10 is a map of the memory base addresses for the AT bus. The memory address ranges from 0 (00 0000 Hex) to 16384K (FF FFFF Hex). The address is actually 16384K minus one; for simplicity, the minus one is omitted from addresses having a "K" suffix. Within this address range, several subranges are allocated or reserved for platform memory and BIOS. Addresses 0 (00 0000 Hex)–512K (06 FFFF Hex) are reserved locations for platform memory. Addresses 512K (07 0000 Hex)–640K (09 FFFF Hex) are the address range for platform memory. An address range 100000 (HEX)–FD FFFF (Hex) is reserved for slot memory. Within this address range, the Ethernet interface module 26 preferably has an address range of C4000–DFFFF. The addresses assigned to the base address bits are shown in Table II.

TABLE II

| Bit 5 | Bit 4 | Bit 3 | Address (Hex) |
|---|---|---|---|
| 0 | 0 | 0 | 0xC4000–0xC7FFF |
| 0 | 0 | 1 | 0xC8000–0xCBFFF |
| 0 | 1 | 0 | 0xCC000–0xCFFFF |
| 0 | 1 | 1 | 0xD0000–0xD3FFF |
| 1 | 0 | 0 | 0xD4000–0xD7FFF |
| 1 | 0 | 1 | 0xD8000–0xDBFFF |
| 1 | 1 | 0 | 0xDC000–0xDFFFF |
| 1 | 1 | 1 | No ROM BIOS - Decode disabled |

Referring again to FIG. 9, the Ethernet interface module 26 loads the configuration byte from the ID Memory 36. The process of reading the configuration byte from the ID memory 36 begins at system power up and is in parallel with the system BIOS power up initialization and check out described above. The parallel reading of the configuration byte allows the BIOS to scan the ROM location for valid boot ROM. If the system properly boots up (Step 306), the boot ROM initialization code then initializes its resources, replaces the desired interrupt vectors, (step 307) and returns the system control back to system BIOS to complete its system initialization (step 308).

On the other hand, if the system does not properly boot up, it is assumed that there is a conflict in the memory address between the ethernet interface module 26 and another add-on module in the computer 10 (step 306). If there is a memory conflict, the CPU 12 halts during the system power up. To resolve the conflict, the Ethernet interface module 26 is removed from the computer 10 (step 310) and installed in a second computer system (step 312). The second system is used to determine whether the Ethernet interface module 26 operates properly by reducing the probability of a memory base address conflict. The second system has the same basic configuration as the first system but preferably does not have any add-on modules, thereby precluding a memory conflict between the Ethernet interface module 26 and an add-on module. In addition, in the jumperless mode, the second system is used to reprogram the ID memory 36 with a different memory base address, as will be described below. After inserting the Ethernet interface module 26 into the second system, the second system is powered up. If the second system boots up properly (step 314), the Ethernet interface module 26 is presumed to be operational and that the problem in the first system was a memory conflict. Thus, it is necessary to reallocate the memory base address location of the Ethernet interface module 26 to eliminate the conflict (step 316).

In the jumper mode, the memory base address location is reallocated by changing the memory base configuration jumpers 189 (FIG. 4) of the module by physically adding or changing jumper wires. In contrast, in the jumperless mode, the memory base address location is changed by reprogramming the configuration byte preferably at address 0X13 of the ID memory 36. As an example, if the memory base address location of the Ethernet interface module 26 originally stored in bits 5–3 of the configuration byte is 000, the address range corresponding to this value 000 as shown in Table II above is the range 0XC4000 (Hex)–0XC7FFF (Hex). If there is an address conflict, then the Ethernet interface module 26 and a second add on module on the AT bus 14 both operate by responding to addresses in this range. The memory base address of the Ethernet interface 26 is reallocated by changing bits 5–3 of the configuration byte. For example, by incrementing the bits 5–3 from 000 to 001, the memory base address range correspondingly increments to a range as shown in Table II of 0XC8000 (Hex)–0XCBFFF (Hex).

To reprogram the ID memory 36, the CPU 12 must first read the configuration byte to know its present state. The CPU 12 sends a request for a memory read for the address of the configuration byte at memory location 0X13 of the ID memory 36. The CPU 12 sends an I/O read ($\overline{IOR}$) signal to the system data bus transceiver 40 to communicate the data address and request commands over the system data bus to the ID memory 36. The interface controller 32 commands the bi-directional tri-state buffer 50 (FIG. 5) of the interface controller 32 to provide data from the buffer system data bus 180 to the flip flops 52 and 54 to provide the address, shift select and shift clock commands to the ID memory 36. The ID memory 36 provides the requested configuration byte from its data output port to the data selection MUX 46 which is commanded by the Ethernet interface module 26 to output the data onto the buffer system data bus 180. The interface controller 32 commands the system data bus transceiver 40 to provide data from the buffer system data bus 180 to the system data bus 106 and the CPU 12 via the AT bus 14 and disables the system data bus transceiver 40. The CPU 12 then increments bits 5–3 of the configuration byte thereby creating a new memory base address and then in the manner described above commands the Ethernet interface module 26 to write the new configuration byte into the ID memory 36 at location 0X13. In a manner similar to the reading of the configuration byte from the ID memory 36 by the CPU 12, the CPU commands the Ethernet interface module 26 to write the incremented configuration byte to the 0X13 memory location by providing the appropriate commands over the system data bus 106 to the ID memory 36.

Referring back to FIG. 9, after the Ethernet interface module 26 has been reprogrammed with a new configuration byte having a memory base address, it is reinstalled into the first computer system (step 317) and the first system is again powered up by repeating step 300. The first system will go through its boot-up routine and load the configuration byte from the ID memory 36 into the shift register/counter 48 as described above for step 302. The interface controller 32 using the decoders 66, 68 decodes the configuration byte at step 304. If the system properly boots up at step 306, the reallocation of the memory location performed at step 316 was correct and the Ethernet interface module 26 proceeds as described above at step 307. On the other hand, if at step 306 the reconfigured Ethernet interface module does not properly boot up, then the process of removing the module from the first system and testing it in the second system at steps 310 and 312 is repeated.

If the second system does not properly boot up at step 314, the configuration byte of the memory is reconfigured as described above at step 316 (step 318). The second system is again attempted to be rebooted at step 314. Alternatively, instead of reconfiguring the memory location at step 318 the module may be inserted into another system (step 320) and the other system rebooted as described above for step 314.

After the Ethernet interface module 26 is reconfigured to eliminate all memory base address conflicts, it is next determined whether there is an I/O base address conflict. As an overview, when the system boots up and assuming that all memory base address conflicts are resolved as described above, the system checks the I/O base address by reading the contents from a number of predetermined register locations on the ethernet interface module 26 and comparing them to the expected values. In an alternate embodiment, the Ethernet interface module does not have a boot memory. In this embodiment, it is unnecessary to resolve a memory conflict because there is not a memory on the Ethernet interface module with which there can be a conflict. If the comparison shows a match, there is no I/O base address conflict. On the other hand, the system presumes there is a conflict if the comparison does not show a match. The system then performs a dummy read from a predetermined register location. In response, the Ethernet interface module 26 increments its I/O base address. The system again reads and compares the contents of the register location but at the new address, and determines whether there is again a conflict. The system repeats this process until no conflict is detected.

The I/O addressing is now described by referring to FIG. 11 which shows the I/O address base for the AT bus 14. The I/O address ranges from 0 (0000 Hex) to 64K (FFFF Hex). Within this address range, each 1K range is divided into two subranges. The first subrange is the lower 256 bytes of memory and is reserved for I/O platform resources, such as the interrupt and DMA controllers. The second subrange is the remaining upper 768 bytes which are available for general I/O slave modules.

In the preferred embodiment as described below, the Ethernet interface module 26 has an I/O address range of 0x260 (Hex) to 0x3FF (Hex), which is within the second subrange. As described above, bits 2–0 of the configuration byte (also referred to as I/OSEL<2:0>) determine the I/O base address. Table III shows the I/O address decoding for the configuration byte within the 0x260 (Hex) to 0x3FF (Hex) address range.

TABLE III

| Bit 2 | Bit 1 | Bit 0 | Address (Hex) |
| --- | --- | --- | --- |
| 0 | 0 | 0 | 0x260–0x27F |
| 0 | 0 | 1 | 0x280–0x29F |
| 0 | 1 | 0 | 0x2A0–0x2BF |
| 0 | 1 | 1 | 0x240–0x25F |
| 1 | 0 | 0 | 0x340–0x35F |
| 1 | 0 | 1 | 0x320–0x33F |
| 1 | 1 | 0 | 0x380–0x39F |
| 1 | 1 | 1 | 0x300–0x31F |

Figure 12:
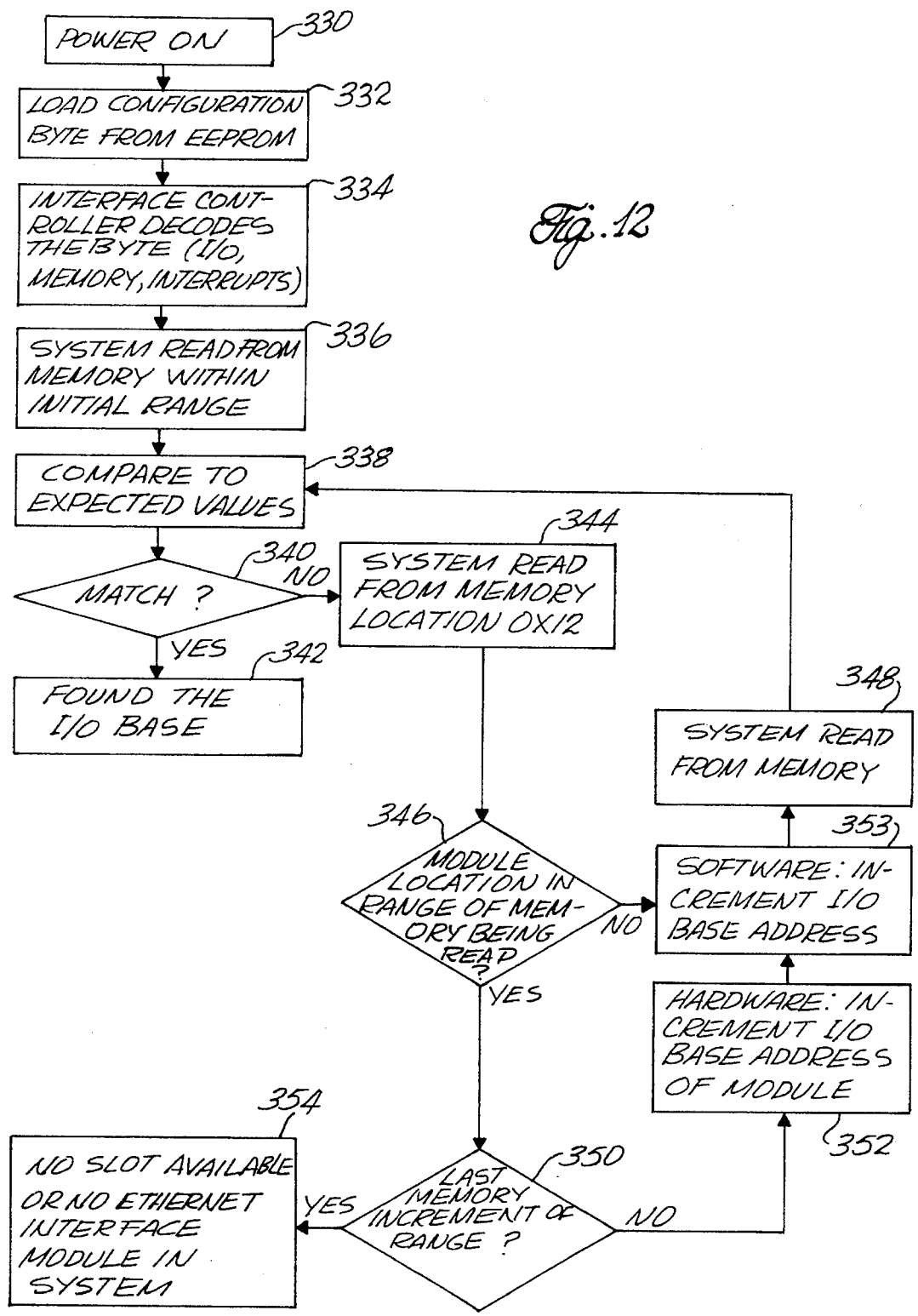
FIG. 12 is a flowchart showing the steps employed in reconfiguring the I/O base address of the Ethernet interface module shown in FIG. 4.

Referring now to FIG. 12, the operation of the I/O base address conflict routine is now described. At this stage, it is assumed that memory base address conflicts have been resolved as described above in FIGS. 9–10. (Alternatively, in the alternate embodiment in which the Ethernet interface module does not have a boot memory, it is unnecessary to resolve the memory conflicts as noted above.) The computer is powered up and performs its initialization routine as described above for step 300 of FIG. 9 (step 330). The interface controller 32 loads the configuration byte from the ID memory 36 into the shift register/counter 48 in a manner similar to step 302 described above for FIG. 9 (step 332). Upon completion of the read, the shift register/counter 48 is set to a counter mode by the jumperless state machine 60. In this mode, only bits 2–0 of the configuration byte which determine the I/O base address of the Ethernet interface module 26 are incremented by the counter. The remaining bits of the configuration byte are left unchanged. The interface controller 32 decodes the configuration byte into I/O base address, memory base address, and interrupts in a manner similar to that described above for step 304 in FIG. 9 (step 334). In addition, a "dirty" within a register in the Ethernet interface module 26 is assigned to monitor the register and counter modes of the special cell. The CPU 12 then reads from memory within an initial range (step 336). More specifically, the CPU 12 enters its I/O program to read the contents of 8 registers of the interface controller 32. Each register preferably has 8 bytes. The reading of 8 registers is for purposes of example only. The invention if not limited to reading only 8 registers. The software programmer may read as few or as many registers as desired in order to meet a desired probability that two different add on modules on the AT bus 14 do not coincidentally have the same values stored in those register locations that are read by the CPU 12 for determining whether there is a conflict.

At power up, the 8 registers of the interface controller 32 are set to predetermined values which are also stored as a module identifier or "company code" as part of the utility program recorded on the hard disk 16. The module identifier preferably uniquely identifies the module relative to other modules on the AT bus. The module identifier is preferably the initial value stored in the first 8 registers of the Ethernet interface module 26. After the CPU 12 reads these 8 registers, it executes a software utility that reads the module identifier from the hard disk 16 and compares it to the read values from the first eight registers (step 338). Because the CPU 12 expects the read values to match that of the module identifier, it interprets a difference between these two values as an I/O-base address conflict. If there is a match between the read values and the module identifier (step 340), the CPU 12 interprets this as there being no I/O base address conflict between the Ethernet interface module 26 and other modules on the AT bus 14 and that it has found a unique I/O base address for the Ethernet interface module 26 (step 342).

On the other hand, if the contents of the 8 registers read by the CPU 12 are different than expected at step 340, the system interprets this either as an I/O base address conflict or that the Ethernet interface module 26 is not at the I/O address that the CPU has just read. The system ignores the existence of the Ethernet interface module 26 by ignoring data applied on the AT bus 14, but the software utility continues by attempting to read from a predetermined memory location (step 344). This predetermined memory location is preferably at address 0X12 (Hex). A read is preferred because if the CPU 12 tries to write to some types of memory devices, the Ethernet interface module 26 may be physically damaged by the conflicting addressing. This read is a "dummy read" because the shift register/counter 48 is set for the counter mode and the CPU 12 does not care what actually is read. In the counter mode, each time a dummy read is made, the shift register/counter 48 increases the value of bits 2–0 by one thereby causing the I/O base address to jump to the next address range as defined in Table III. The initial I/O base address range is preferably set to be 0X300 (Hex)–0X31F (Hex) defined by bits 2–0 of the configuration byte with a value 111. When the counter is incremented upon the read from memory location 0X12, the bits 2–0 of the configuration byte change to a value of 000 corresponding to a new address range of 0X260 (Hex)–0X27F (Hex). The utility program reads the interface controller 32 for the correct module identifier every time the shift register/counter 48 counts up to the next base I/O address. This allows the Ethernet interface module 26 to dynamically reconfigure itself to a nonconflicting I/O base address. However, after seven increments, the bits 2–0 return to a value of 111. After eight such memory reads, either there is no Ethernet interface module 26 in the system or no I/O base address slot is available. The CPU 12 determines whether the module location is in the range of the memory being read (step 346). If it is not within the range, the value of the configuration byte is not incremented (or counted) and the increments the I/O base address (step 353) and reads the registers at the incremented address (step 348) and loops back to step 338 to compare the read value to the expected value. If there is not a match at step 340, the CPU 12 loops back to step 344. If there is a match, the CPU 12 loops to step 342. The CPU sends a write command to a predetermined address and the interface controller 32 sets the shift register/counter 48 to the count mode and switches to user mode and allows the user to access the ID memory from the system side as desired.

On the other hand, if the module address is within the range of memory being read at step 346, the CPU 12 determines whether it is the last memory increment of the range (step 350) and, if so, then either no I/O base address range slot is available or no Ethernet interface module 26 is installed in the system (step 354). On the other hand, if the memory read is not the last memory increment of the memory range, the controller chip 32 increments the I/O base address of the Ethernet interface module 26 by increasing the bit 2–0 of the shift register/counter 48 (step 352). The CPU increments the I/O base address (step 353) and then reads from the 8 registers at the incremented I/O base address (step 348). The CPU 12 loops back to comparing the read values to the expected values at step 338.

To avoid accidentally changing the configuration byte in the shift register/counter 48 from an accidental write to address 0x12, a software disable is provided. By setting an I/O base unlock bit in the data link register to 0, the shift register/counter 48 is disabled until the system hardware reset is issued again. Upon the reset command, the unlock bit is set to 1 allowing the Ethernet interface module 26 to dynamically reconfigure itself to a nonconflicting I/O base address.

Once the I/O address conflicts are resolved, the software can then proceed with its initialization routine. The Ethernet interface module 26 sets the shift register/counter 48 back to the register mode by setting/resetting designated dirty bit. The utility program can now read the new configuration byte from the shift register/counter 48 and reprogram the configuration byte stored in the ID memory 36 with the new base addresses.

Having completed the I/O address program, the interrupts are now described. As described above, bits 7–6 are dedicated to the interrupt line configuration. Interrupt signals allow add-on cards to request interrupt service by the CPU 12. These bits are programmable for selecting any one of four interrupt lines available at the host interface side of the Ethernet interface module 26. The user has the option of connecting these lines to any set of four system interrupt lines, interrupts 0–3, available to the system user. The utility tests the interrupt configuration, and if there is a conflict, reprograms the ID memory 36 with the next available interrupt option, reboots the system and retests the configuration.

Table IV lists interrupt bit definition.

TABLE IV

| Bit 7 | Bit 6 | Description |
| --- | --- | --- |
| 0 | 0 | interrupt 0 |
| 0 | 1 | interrupt 1 |
| 1 | 0 | interrupt 2 |
| 1 | 1 | interrupt 3 |

After the ID memory 36 is reprogrammed to resolve any memory and I/O base address and interrupt conflicts, further reprogramming of the configuration byte is unnecessary. Subsequent use of the computer 10 as configured will have no conflicts.

While the invention has been described and preferred embodiments disclosed, it is anticipated that other modifications and adaptations will occur to those skilled in the art. It is intended therefore that the invention be limited only by the claims appended hereto.

What is claimed is:

1. An interface controller for an addressable interface module, the interface module for coupling along with other addressable interface modules over a communication bus to a central processor, each interface module responding to a read command using a memory address provided by the central processor on the communication bus for reading configuration or other data from the interface module to the communication bus using a memory base address or to a write command using a memory address provided by the central processor on the communication bus for writing data from the communication bus to the interface module using the memory base address, the central processor being operative for comparing such configuration data read from the interface module to predetermined data for determining if the memory base address for the interface module is the same as the memory base address for one of the other interface modules and for issuing on the communication bus a dummy read command using a predetermined memory address, the interface controller comprising:
- a stored memory base address for use by the corresponding interface module in determining a unique memory base address for response by the corresponding interface module;
- a decoder for decoding the stored memory base address including a modified memory base address for determining the unique memory base address for response by the corresponding interface module;
- means for reading the configuration data stored at the memory address using the stored memory base address responsive to such a read command for reading the configuration data; and
- means for automatic modification of the stored memory base address in the event the latter is the same as the unique memory base address for one of the other interface modules, the means for automatic modification comprising means responsive to the dummy read command using the predetermined memory address for modifying the stored memory base address to said modified memory base address.

2. The interface controller of claim 1 formed on a single integrated circuit chip.

3. The interface controller of claim 1 wherein the means for modification comprises a counter for incrementally adjusting the value represented by the stored memory base address.

4. The interface controller of claim 3 wherein the interface controller comprises a memory for initially storing the stored memory base address and the counter is coupled to receive the stored memory base address from the memory prior to incrementally adjusting.

5. The interface controller of claim 4 comprising a state machine for controlling a read of the stored memory base address out of the memory and the loading of a signal corresponding to the stored memory base address into the counter.

6. The interface controller of claim 1 wherein the stored memory base address comprises first and second memory base addresses, the first said memory base address being the one that is modified, and the second memory base address being the memory base address for a memory address space, said decoder comprising means for decoding both of the first and second memory base addresses to provide separate memory base addresses for such interface controller.

7. An automatically reconfigurable and addressable interface module for coupling between a communication network and, along with other addressable interface modules and a central processor, to a communication bus, each interface module responding to a read command using a memory address provided by the central processor on the communication bus for reading configuration or other data from the interface module using a memory base address or to a write command using a memory address provided by the central processor on the communication bus for writing data from the communication bus to the interface module using the memory base address, the central processor being operative for comparing such configuration data read from the interface module to predetermined data for determining if the memory base address for the interface module is the same as the memory base address for one of the other interface modules and for issuing on the communication bus a dummy read command using a predetermined memory address, the automatically reconfigurable interface module comprising:

- a memory for storing the configuration data unique to the automatically reconfigurable interface module;
- a register for storing the memory base address for use by the automatically reconfigurable interface module in determining a unique memory base address for response by the corresponding automatically reconfigurable interface module;
- means for reading the configuration data stored in the memory using the stored memory base address responsive to said read command for reading the configuration data from the memory for comparison by the central processor with the predetermined data;
- means responsive to the dummy read command using the predetermined memory address for modifying the stored memory base address to a modified memory base address; and
- a decoder for decoding the stored memory base address including the modified memory base address for determining the unique memory base address for response by the corresponding automatically reconfigurable interface module.

8. The automatically reconfigurable interface module of claim 7 further comprises an additional memory for data passed over such communication bus, and wherein the register stores an additional memory base address for such additional memory and wherein said decoder comprises means for also decoding said additional memory base address into a separate memory base address for addressing the additional memory.

9. The automatically reconfigurable interface module of claim 7 wherein the automatically reconfigurable interface module provides an interface between such a communication bus and such a communication network.

10. The automatically reconfigurable interface module of claim 9 wherein the automatically reconfigurable interface module interfaces with a local area network.

11. The automatically reconfigurable interface module of clam 10 wherein the automatically reconfigurable interface module interfaces with an ethernet network.

12. The automatically reconfigurable interface module of claim 7 wherein the automatically reconfigurable interface interfaces to an AT communication bus.

13. The automatically reconfigurable interface module of claim 7 further comprising:
- a system interface coupled to the communication bus for controlling communication with the communication bus;
- a buffer memory for storing data communicated between the automatically reconfigurable interface module and either the communication bus or such communication network, a buffer controller for controlling the transfer of data from the buffer memory;
- a transmitter for processing and providing data to the communication network in response to commands from the buffer controller; and
- a receiver for receiving and processing data from the communication network.

14. A microprocessor system comprising:
- a communication bus;
- a plurality of addressable interface modules, each interface module coupled to the communication bus and responding to a read command using a memory address provided by a central processor on the communication bus for reading configuration or other data from the interface module using a base memory address or to a write command using a memory address provided by the central processor on the communication bus for writing data from the communication bus to the interface module using the memory base address, at least one of said interface modules comprising an automatically reconfigurable interface module; and the central processor being coupled to the communication bus and being operative for comparing such configuration data read from the interface module to predetermined data for determining if the memory base address for the interface module is the same as the memory base address for one of the other interface modules and for issuing on the communication bus a dummy read command using a predetermined memory address;

the automatically reconfigurable interface module comprising:

a memory for storing the configuration data unique to the automatically reconfigurable interface module;

a register for storing the memory base address for use by the automatically reconfigurable interface module in determining a unique memory base address for response by the corresponding automatically reconfigurable interface module;

means for reading the configuration data stored in the memory using the stored memory base address responsive to said read command for reading the configuration data from the memory for comparison by the central processor with the predetermined data;

means responsive to the dummy read command using the predetermined memory address for modifying the stored memory base address to a modified memory base address; and a decoder for decoding the stored memory base address including the modified memory base address for determining the unique memory base address for response by the corresponding automatically reconfigurable interface module.

15. The microprocessor system of claim 14 wherein the automatically reconfigurable interface module comprises:

a data bus coupled for passing data on the communication bus between the central processor and the automatically reconfigurable interface module; and an address bus coupled for passing the address signals on the communication bus from the central processor bus to the automatically reconfigurable interface module.

16. The microprocessor system of claim 14 wherein the automatically reconfigurable interface module comprises:

an additional memory for data passed over such communication bus, and wherein the register stores an additional memory base address for establishing the base for the memory space of such additional memory and wherein said decoder also is adapted for decoding said additional memory base address into a separate memory base address for addressing the additional memory.

17. A method for automatically generating a unique memory base address for an addressable interface module, the addressable interface module being adapted to be coupled along with other addressable interface modules over a communication bus to a central processor, each interface module being adapted to respond to a read command using a memory address provided by the central processor on the communication bus for reading configuration or other data from the interface module using a memory base address or to a write command using a memory address provided by the central processor on the communication bus for writing data from the communication bus to the interface module using the memory base address, the central processor being operative for comparing such configuration data read from the interface module to predetermined data for determining if the memory base address for the interface module is the same as the memory base address for one of the other interface modules and for issuing on the communication bus a dummy read command using a predetermined memory address, the method comprising the steps of:

storing a memory base address in the interface module;

reading the configuration data stored at the memory address using the stored memory base address responsive to such a read command for reading the configuration data;

modifying the stored memory base address to a modified memory base address in response to the dummy read command using the predetermined memory address in the event that the stored memory base address is the same as the unique memory base address for one of the other interface modules; and decoding the modified address for use by the interface module in determining the unique memory base address for response by the interface module.

18. The method of claim 17 wherein the step of modifying the stored memory base address further includes the step of incrementally adjusting in a counter the value represented by the stored memory base address.

19. The method of claim 18 wherein the interface controller comprises a memory and further including the steps of:

initially storing the stored memory base address in the memory; and receiving in the counter the stored memory base address from the memory prior to the step of incrementally adjusting.

20. The method of claim 19 wherein the interface controller having the interface controller comprises a state machine and further comprising the step of controlling using the state machine to control the reading of the stored memory base address out of the memory by providing a signal corresponding to the stored memory base address into the counter at the time at which the counter performs the incrementally adjusting increments.

21. The method of claim 17 wherein the stored memory base address comprises first and second memory base addresses, the first said memory base address being the one that is modified, and further comprising the step of decoding both of the first and second memory base addresses to provide separate memory base addresses.

* * * * *

UNITED STATES PATENT AND TRADEMARK OFFICE
CERTIFICATE OF CORRECTION

PATENT NO. : 5,590,374
DATED : December 31, 1996
INVENTOR(S) : Ryan E. Shariff; Gerald Moseley; Jack J. Chen; Wen-Feng Chang; Fazal Abbas It is certified that error appears in the above-indentified patent and that said Letters Patent is hereby corrected as shown below:

Column 10, line 44, change "237" to -- 235 --.
Column 15, line 14, change "reinstailed" to -- reinstalled --.
Column 16, line 49, after "invention" delete "if".

Signed and Sealed this

Twenty-eighth Day of April, 1998

Attest:

BRUCE LEHMAN

Attesting Officer          Commissioner of Patents and Trademarks